United States Patent Office 3,097,180
Patented July 9, 1963

3,097,180
HEAT TREATMENT OF A BLEND OF BUTADIENE-ACRYLONITRILE COPOLYMER AND VINYL CHLORIDE POLYMER LATICES AND RESULTING COALESCED LATEX PRODUCT
Harry W. Tausch, Cuyahoga Falls, Ohio, assignor to The Goodyear Tire & Rubber Company, Akron, Ohio, a corporation of Ohio
No Drawing. Filed May 3, 1960, Ser. No. 26,415
5 Claims. (Cl. 260—29.7)

This invention relates to the production of an improved latex of a blend of mutually compatible resin and rubber latices and more specifically to the heat treatment of a blend of nitrile rubber and vinyl resin latices to intimately coalesce these particles one with the other.

Many uses have been developed for rubber latices and resinous latices and of particular value is the blend of a nitrile rubber latex with a resinous vinyl latex for use in coating fabric, particularly for use as a reinforcing ply when coated on the underside of the fabric of floor covering materials, such as carpeting.

Physical blends of 70 parts of a butadiene/acrylonitrile rubbery copolymer latex with 30 parts of a polyvinyl chloride latex produced relatively tough films when the latex is deposited upon a surface and air dried at room temperature (70° F.). However, rug manufacturers find it desirable to increase the tensile strength of the reinforcing coating of latex applied to the back of the carpeting material and find that a considerable improvement in tensile is obtained when the latex-treated carpeting is heated for a short period of time at elevated temperatures approaching the vicinity of 300° F. This treatment, however, is undesirable since it adversely affects the various components used in making the carpeting. With the advent of new materials in the construction of carpeting having higher resistance to the deleterious effects of heat, a certain amount of heat treatment of the reinforcing latex coating can be tolerated but it is desirable under certain conditions not to subject the carpeting to the heat treatment in order to increase the tensile of the latex coating.

It has now been discovered that unexpected increases in tensile strength of the latex coating are achieved when a blend of the latices of this invention are subject to treatment by heat at temperatures ranging from about 250° F. to about 350° F. for periods of time ranging from about two minutes to about five hours. This heat treatment of the latex in the latex form causes a fusion or intimate blending or coalescence of the nitrile latex particles with the vinyl chloride resin particles without the heretofore undesirable result of causing the latices to coagulate. It has also been discovered that when a blend of the latices of this invention is heat treated in accordance with the conditions set forth herein, the resulting latex is mechanically stable to influences of heat and shear stresses for extending periods of time. More important it has been discovered that a more than additive increase in tensile strength is obtained when a blend of the latices of this invention are heat treated in accordance with the conditions disclosed herein, as will be observed from the data set forth in the following example:

*Example 1.—Nitrile Rubber*

A butadiene/acrylonitrile rubber latex was prepared by emulsion polymerization according to the following recipe.

| Material: | Parts by weight |
|---|---|
| Water | 114.6 |
| Sodium dodecyl benzene sulfonate (anionic emulsifier) | 3.6 |
| Trisodium phosphate (buffer) | 0.2 |
| Potassium persulfate ($K_2S_2O_8$) (initiator) | 0.2 |
| Tertiary butyl mercaptan (modifier) | 0.45 |
| Butadiene | 67.0 |
| Acrylonitrile | 33.0 |
| 2,5-ditertiary amyl hydroquinone (stopper) | 0.05 |
| Phenyl beta naphthylamine (antioxidant) | 1.5 |
| Triton X–202 (sodium diisobutyl-p-phenylene trioxyethylene sulfonate) (stabilizer) | 9.8 |

The first seven materials were charged to a 5-gallon pressure reactor equipped with a 6-inch turbine propeller. The reactor was closed and then heated to a temperature ranging from 75° F. to 300° F. as measured internally and after 340 minutes of reaction time a conversion of 93% of the monomer to polymer containing 42% solids was obtained, the primary heating being carried out at 280° F. for 80 minutes after 180 minutes of heating up the reaction from 75° F. to 280° F. To this resulting latex was added the last three ingredients listed above.

In addition to Triton X–202, the stabilizer listed above, other stabilizers of the general class alkyl aryl polyoxyethylene sulfonates and sulfates of alkali metals may be used. Triton X–202 is described in an article appearing in "Resin Review," vol. 8, page 4, No. 2 (1958), published by Rohm & Haas Company, Philadelphia 5, Pennsylvania; and also in a publication entitled "Surface Active Agents and Detergents," vol. 2, page 74 (1958), by Schwartz, Perry, and Berch, published by Interscience publishers, New York. These stabilizers, broadly referred to as alkyl aryl polyoxyethylene sulfonates, may be represented by the structural formula

in which R is an alkyl group containing from 1 to 8 carbon atoms and in which $n$ is a whole number of 1 through 6 or more. The alkyl aryl polyoxyethylene sulfonates and sulfates are anionic stabilizers having a nonionic structure built into the molecule. The polyether part of the molecule is believed to impart the activity characteristic of nonionic surfactants. Accordingly, all or part of this type of stabilizer may be substituted by mixtures of other nonionic polyether types of stabilizers together with anionics of the alkali metal alkyl sulfonates or sulfates, or the alkali alkyl-aryl sulfonates or sulfates. It is preferred, however, to employ the Triton X–202 type of stabilizer identified above as belonging to the general class known as alkyl-aryl polyoxyethylene sulfonates and sulfates.

It has been found that other monomeric acrylic nitriles, such as methacrylonitrile, ethacrylonitrile, chloroacrylonitrile, and the like may be substituted for acrylonitrile in the preparation of the copolymer.

In addition, other monomeric diene hydrocarbons may be substituted for the butadiene-1,3 in the polymerization recipe above. The conjugated dienes most frequently used are those conjugated dienes containing 4 to 12 carbon atoms per molecule. By the way of example, the following conjugated dienes are mentioned: 1,3-butadiene; 2,3-dimethyl-1,3-butadiene; 2-phenyl-3-ethyl-1,3-butadiene; 2,3-dipropyl-1,3-butadiene; isoprene; piperylene; 3-furyl-1,3-butadiene; 2-methoxy-1,3-butadiene; chloroprene; bromoprene; methylchloroprene and the like. Of the conjugated dienes known to be polymerizable in an aqueous emulsion system, 1,3-butadiene is most frequently preferred due to its availability and the physical properties of the polymer prepared from butadiene. These dienes may be substituted for all or part of the butadiene in admixture with acrylonitrile and/or the other monomeric substitutes for acrylonitrile mentioned above.

Example 2.—Vinyl Resin

A vinyl chloride polymer resin latex was prepared by emulsion polymerization of vinyl chloride according to the following recipe.

Material: Parts by weight
- Water — 75.0
- Sodium dodecyl benzene sulfonate (anionic emulsifier) — 5.0
- Potassium persulfate ($K_2S_2O_8$) (initiator) — 0.12
- Sodium carbonate — 0.5
- Sodium chloride — 0.3
- Vinyl chloride — 90.0
- Diethyl maleate — 10.0
- Sodium thiosulfate — 0.039

The foregoing materials were charged to a pressure vessel equipped with a means to agitate the polymerization system during the time the ingredients were heated to bring about polymerization of the monomer to the polymer.

The vinyl chloride resins are a well known class of materials consisting of the simple polymers of vinyl chloride and copolymers of vinyl chloride in which the essential vinyl chloride polymer chain is interspersed at intervals with the residues of other mono-ethylenically unsaturated or conjugated diethylenically unsaturated compounds which have been copolymerized therein. In general the essential character of the vinyl chloride resin is unchanged aside from a certain desirable increase in processability and flexibility by the copolymerization therein of up to 20% based on the total weight of the copolymer of these unsaturated compounds. Suitable compounds for copolymerization with vinyl chloride include vinyl esters such as vinyl bromide, vinyl acetate, vinyl chloroacetate, vinyl butyrate, vinyl alkyl sulfonates, and other higher fatty acid vinyl esters; vinyl alkyl ethers, for example vinyl ethyl ether, vinyl isopropyl ether, vinyl chloroethyl ether; cyclic unsaturated monomers including styrene, the mono- and poly-nuclearly chlorinated styrenes, coumarones, indene, vinyl naphthalene, vinyl pyridines, vinyl pyrrole; alkyl acrylates including ethyl acrylate, methyl methacrylate, ethyl methacrylate, ethyl chloroacrylate, acrylonitrile, methacrylonitrile, diethyl maleate, diethyl fumaric, vinylidene compounds including vinylidene chloride; unsaturated hydrocarbons beginning with ethylene; allyl compounds including allyl acetate, allyl chloride, and allyl ethyl ether; and conjugated ethylenically di-unsaturated compounds such as butadiene, isoprene, chloroprene, 2,3-dimethyl-1,3-butadiene and piperylene. In general, monomers that are known to polymerize with vinyl chloride, for example as has been listed by Krczil in "Kurzes Handbuch der Polymerisationstechnik—II Mehrstoff Polymerisation," published by Edwards Brothers, Inc., pages 735–737 (1945), may be used in making vinyl chloride copolymers. In general, the criterion of a practical comonomer for use with vinyl chloride is that, on a mole percentage basis, an initial charge of 96% vinyl chloride, balance comonomer, shall yield an initial comonomer containing at least 90% vinyl chloride and not more than 99% vinyl chloride.

Example 3.—Rubber/Resin Blend

Seventy (70) parts of the butadiene/acrylonitrile latex of Example 1 was blended with 30 parts of the vinyl chloride polymer latex of Example 2 and then alkalized with KOH as follows:

|  | Dry (wt.) | Percent (wt.) | Wet (wt.) |
|---|---|---|---|
| Butadiene/acrylonitrile latex | 70.0 | 42.6 | 164.0 |
| Vinyl chloride latex | 30.0 | 53.1 | 56.5 |
| KOH (5% water solution) | 0.18 | 5.0 | 3.6 |

This compounded blend of latices had the following properties:

- Solids (percent) — 44.4.
- pH — 9.2.
- Mechanical stability (Hamilton Beach) — Stable for 10 min.
- Brookfield viscosity (cps.) — 19.0.
- Coagulum content (percent) — 0.002.
- Turbidity — 0.602.
- Mooney (as measured with a small rotor 1½ min. after heating for 1 min. at 212° F.) — 53.0.
- Solubility in methyl ethyl ketone (percent) — 59.

The latex was thickened by adding a 6% solution of sodium polyacrylate and spread upon a smooth surface to form a wet film 0.04 inch thick which was then air dried at 70° F. The resulting film was tested for physical properties and found to have a tensile of 152 p.s.i., an elongation of 835%, a crescent tear of 65 pounds per inch, a water absorption of 24.3%, and a water extraction of 8.4%.

The air-dried film was then heat treated in an oven for three minutes at 300° F. and the resulting film had the following physical properties:

- Modulus 100% — 220
- Modulus 200% — 310
- Tensile (p.s.i.) — 753
- Elongation (percent) — 810
- Crescent tear (lb./in.) — 106
- Water absorption (percent) — 30.8
- Water extraction (percent) — 7.5

Example 4.—Pre-Fused Rubber/Resin Blend

Seventy (70) parts of the butadiene/acrylonitrile latex of Example 1 was blended with 30 parts of the vinyl chloride polymer latex of Example 2 and then alkalized with 0.18 part of a 5% solution of potassium hydroxide to adjust the pH of the blended latices to 11.5. Thirty-five (35) pounds of this latex composition was placed in a 5-gallon glass-lined pressure vessel provided with a 30 inch vacuum gauge and a 150 pound pressure gauge and a pop-off valve on the steam jacket, which was set to release at 60 p.s.i. The vessel was evacuated to 24 inches and the latex composition was heated with water and steam contained in the jacket. The initial warm-up to 280° F. required 190 minutes. The temperature was maintained between 280° F. and 285° F. for 62 minutes. The cooling back to room temperature required 92 minutes. The latex composition was stirred with a 6-inch turbine propeller rotating at 247 r.p.m. during the total heating and cooling periods.

The resulting heat treated blend of latices was then removed from the vessel and a wet film 0.04 inch thick was cast on a smooth surface and air dried at 70° F. The heat treated latex had the following properties:

- Solids (percent) — 43.7.
- pH — 5.6.
- Mechanical stability (Hamilton Beach) — Stable for 10 min.
- Brookfield viscosity (cps.) — 16.0.
- Coagulum (percent) — 0.003.

Turbidity _____ 1.26.
Mooney (see Example 3)_____ 82.0.
Solubility in methyl ethyl ketone (percent)___ 66.0.

The cast film had the following physical properties:

Modulus 100% _____ 170
Modulus 200% _____ 200
Tensile (p.s.i.) _____ 310
Elongation (percent) _____ 925
Crescent tear (lb./in.) _____ 70
Water absorption (percent) _____ 14.4
Water extraction (percent) _____ 6.6

*Example 5.—Rubber/Resin Blend Pre-Fused Then Post-Fused*

The pre-fused blend of latices of Example 4 was cast into a film 0.04 inch thick and the resulting film was then heat treated in an oven for three minutes at 300° F. The resulting heat treated film had the following physical properties:

Modulus 100% _____ 185
Modulus 200% _____ 273
Tensile (p.s.i.) _____ 1,000
Elongation (percent) _____ 1,035
Crescent tear (lb./in.) _____ 109
Water absorption (percent) _____ 19.3
Water extraction (percent) _____ 5.7

In the foregoing examples one may readily observe that an unexpected result is obtained in heat treating the blend of latices used in this invention which is not obtained when the unfused latex blend is heat treated after the latex has been spread to form a film and air dried. For example, the conventional blend of the latices of this invention produces a tensile of 152 p.s.i. when spread as a film and then air dried at room temperature, whereas the same film produces a tensile of 310 p.s.i. when the blend of latices is first heated in accordance with the disclosure of this invention to cause a fusion of the particles of the blended latices without at the same time disturbing the latex state of these latices. When the heat treated latex of the present invention may be used under conditions where it may also be heat treated a second time in the form of an air dried film, then a tensile of 1,000 p.s.i. is developed against a tensile of only 753 p.s.i. which is developed when the untreated latex is heat treated after the latex has been spread to form a film and air dried. Thus, it may be seen that an increase of 158 p.s.i. tensile is developed by heat treating the latex prior to its use as an air dried film and an increase of 601 p.s.i. is developed when the untreated latex is heated after the latex has been air dried into a film. Thus, the maximum increase in tensile using the conventional post-heat treatment of the air dried latex film is 601 p.s.i., whereas a greater than additive total value of 848 p.s.i. is obtained when the latex of this invention is both heat treated in the latex form and then heat treated as an air dried latex film. This is indeed an unexpected result; one that would not be obvious to a person skilled in this art having the information presently at hand concerning the tensile strengths obtained from the heat treatment of these particular latices. The blending of the resin and rubber latices described herein may range from a ratio of 95/5 to 5/95 but it is preferred to use a ratio of resin to rubber of from 40/60 to 20/80, depending upon the stiffness desired in the finished film.

Under conditions where post-heat treatment may be applied to the air dried film of latex spread on, for example, the fabric backing of a carpeting material, it is desirable to add a heat stabilizer to the blended latices to inhibit discoloration of the vinyl polymer. A suitable heat stabilizer that may be used in this invention is tin dibutyl dilaurate and similar tin compounds well known as heat stabilizers for vinyl polymers.

The physical properties of the blends of the latices of this invention are greatly improved when heat treated in accordance with the methods disclosed herein, particularly in regard to the mechanical stability of the latex to heat and shear forces. Also a film of this improved latex has improved flexibility, clarity, toughness, and water resistance.

In carrying out the heat treatment of the latices of this invention, it is desirable to increase the pH of the latex blend by adding a base thereto, as for example potassium hydroxide, sodium hydroxide, and the like. It is desirable to increase the pH to values as high as 12 and not lower than about 9. The increase in the alkalinity of the latex system increases the stability of the latex against coagulation during heating, stirring, and coalescence of the particles and while the pH of the system decreases from the alkaline range of 9 to 12 to the acid range of 3 to 6 during the heat treatment operation as well as remaining stable for prolonged periods of time of from one to more than two years after undergoing the heat treatment and being adjusted back to the alkaline range of from about 9 to about 12.

Although the invention has been described with particular reference to blends of the rubber and resin latices of the foregoing examples, the treatment is equally applicable to blends of resins and rubbers which are fusible with each other at the temperatures used herein and stable or made stable against coagulation during the heating step.

It is desirable to agitate the blend of latices during the heating operation to prevent skin formation at the temperature differential between the jacket of the reactor and the internal temperature of the body of latex.

From the foregoing disclosure of this invention it becomes clear that there has been found a process for preparing a stable system of a diene/nitrile rubber latex and a polyvinyl chloride latex which when heated to a temperature sufficient to cause fusion of the particles of the latices, produces a new stable latex, the particles of which knit together to produce a clear film which has strong, tough, resilient properties which neither latex possesses alone, when the heat treated blend of latices is cast and dried at room or at moderate oven drying temperature.

While certain representative embodiments and details have been shown for the purpose of illustrating the invention, it will be apparent to those skilled in this art that various changes and modifications may be made therein without departing from the spirit or scope of the invention.

What is claimed is:

1. A latex composition comprising particles of a conjugated diene-acrylonitrile rubbery copolymer intimately coalesced with particles of vinyl chloride resin as a result of heating the composition in latex form at about 250° F. to about 350° F.

2. A latex composition comprising particles of a copolymer resulting from the reaction of a mixture containing a major amount of a conjugated diene and a minor amount of acrylonitrile intimately coalesced with particles of vinyl chloride resin as a result of heating the composition in latex form at about 250° F. to about 350° F.

3. A latex composition comprising particles of a copolymer resulting from the reaction of a mixture containing a major amount of a conjugated diene and a minor amount of acrylonitrile and a stabilizer selected from the group consisting of alkyl-aryl polyoxyethylene sulfonates and alkyl-aryl polyoxyethylene sulfates intimately coalesced with particles of vinyl chloride resin resulting from the reaction of vinyl chloride in the presence of a stabilizer selected from the group consisting of alkyl-aryl polyoxyethylene sulfonates and alkyl-aryl polyoxyethylene sulfates, the coalescence of the particles resulting from the heating of the composition in latex form at about 250° F. to about 350° F.

4. The method of making a prefused latex composition which comprises heating a mixture of latices having an initial pH of from about 9 to about 12 at a temperature of from about 250° F. to about 350° F. until the particles of one latex are intimately coalesced with the particles of the other latex, one latex being a copolymer resulting from the reaction of a mixture containing a major amount of a conjugated diene and a minor amount of acrylonitrile, the other latex being vinyl chloride resin.

5. A carpeting material, the fabric backing of which has deposited thereon a film resulting from the drying of a layer of a latex composition comprising particles of a conjugated diene-acrylonitrile rubbery copolymer intimately coalesced with particles of vinyl chloride resin as a result of heating the composition in latex form at about 250° F. to about 350° F.

References Cited in the file of this patent

UNITED STATES PATENTS

| | | |
|---|---|---|
| 2,614,094 | Wheelock | Oct. 14, 1952 |
| 2,739,082 | Bezman et al. | Mar. 20, 1956 |
| 2,769,726 | Waterau et al. | Nov. 6, 1956 |
| 2,885,300 | Cunningham et al. | May 5, 1959 |

OTHER REFERENCES

Smith: Blends of Polyvinyl Chloride With Rubbers, Rubber Age, vol. 74, January 1954, pages 552–553.

Cook: "Latex—Natural and Synthetic," Reinhold Publishing Corp., New York, N.Y., 1956.